United States Patent [19]

Koponen

[11] 4,140,500
[45] Feb. 20, 1979

[54] MEANS FOR SEPARATING GAS FROM A LIQUID SUSPENSION

[75] Inventor: Ilmari Koponen, Savonlinna, Finland

[73] Assignee: Enso-Gutzeit Osakeyhtiö, Helsinki, Finland

[21] Appl. No.: 856,170

[22] Filed: Nov. 30, 1977

[51] Int. Cl.² .............................................. B01D 19/00
[52] U.S. Cl. ....................................... 55/194; 55/195; 55/201
[58] Field of Search ..................... 55/189, 194, 55, 57, 55/176, 195, 201; 162/53, 380

[56] References Cited

U.S. PATENT DOCUMENTS

| | | | |
|---|---|---|---|
| 1,457,153 | 5/1923 | Elliott | 55/195 X |
| 2,571,219 | 10/1951 | DeCew | 55/194 X |
| 2,689,018 | 9/1954 | Kittredge | 55/201 X |
| 3,494,101 | 2/1970 | Wikdahl | 55/55 |
| 3,616,599 | 11/1971 | Burnham, Sr. | 55/55 X |

FOREIGN PATENT DOCUMENTS 1224442 6/1960 France ....................................... 55/176

Primary Examiner—Robert H. Spitzer
Attorney, Agent, or Firm—Toren, McGeady and Stanger

[57] ABSTRACT

Means for separating gas from a liquid suspension, in particular from a fibre suspension which is going to be conducted to a paper machine, the means including a separation space wherein a dispersion nozzle has been mounted to serve the purpose of atomizing into droplets the suspension introduced into the upper part of the separation space and which has been provided with a drain pipe for removal of the suspension relieved of gases that accumulates in the lower part of the separation space, and a gas removal space connected to a vacuum source and which at the same time communicates with the separation space so that the gas can be liberated from the suspension with the aid of subatmospheric pressure and drawn out of the separation space. In the wall confining the separation space and the gas removal space there have been formed one or several upwardly widening gas removal apertures by which the spaces communicate with each other.

3 Claims, 2 Drawing Figures

MEANS FOR SEPARATING GAS FROM A LIQUID SUSPENSION

SUMMARY OF THE INVENTION

Separating of gas from a liquid suspension comes into question in the manufacturing of paper in particular, in which case the air ontained in the fibre suspension supplied to the paper machine interferes with the sheet formation process on the wire, especially when the machine is run at high speed. The separation may be accomplished in that liquid suspension is conducted into a separation space so that the liquid runs along the walls in the form of a continuous film. As a result of the vacuum prevailing in the separation space the suspension is boiling, whereby air and water vapour are liberated therefrom. In a means of prior art operating according to this principle the fibre suspension is introduced into the cylindrical separation space by a vertical tube running centrally in the separation space. The tube has at its top end an adjustable slit, from which the suspension spreads out and forms a continuous film on the inner wall of the cylindrical jacket confining the separation space. The air and water vapour set free from the suspension are removed into the annular space under vacuum which is formed between said vertical feed tube and the separation space, this annular space containing means for condensing the steam and the air being mainly transported downwardly in this space and finally removed through the lower part of the means. It is thus understood that the air that has to be removed has to travel in a direction opposite to its natural upward tendency. The fibre suspension from which the air has been removed accumulates in the lower part of the separation space in such manner that the free suspension level adjusts itself to be at the height of the overflow threshold leading to the annular space. Thereby when the liquid level rises in the separation space, fibre suspension will run past the overflow into the annular space. If this flow is copious, it may imply an end to the suction in the annular space. At all events fibres are carried over into the annular space unless care is taken that the liquid level remains at a height below the overflow. In this apparatus the liquid level may be regulated by controlling the vacuum in the annular space. However such control is not particularly advantageous in practice. On the other hand the access of fibre suspension to the annular space may be prevented by placing the overflow in the upper part of the separation space, but then the drawback is incurred that the time which the fibre suspension from which the air has to be removed delays in the area where the vacuum acts is short and therefore the best possible air removal effect is not achieved. As a result of the construction of the means, the air condensing system is also highly complex.

The fibre suspension that has to be freed of air may be conducted into the separation space carrying vacuum, not only as a continuous film but also in the form of droplets, employing a suitable atomizer nozzle. Atomizing increases the quantity of air released, because the aggregate surface area of the liquid droplets exceeds the area which is formed when the fibre suspension is present as a film. It is further a fact that the time which the liquid droplets stay in the separation space subject to vacuum is longer and increases accordingly as the droplet size decreases.

The object of the present invention is to provide a means wherein the separation of gas is based on dispersion of the liquid suspension into droplets and wherein the drawbacks associated with the above-mentioned means of prior art have been avoided. The means of the invention is characterized in that in the wall confining the separation space and the gas removal space, one or several upwardly widening gas removal apertures have been made, through which the said spaces communicate with each other. Most appropriately the said gas removal apertures have the shape of triangles standing on their apex. A means of this kind will be rather simple as regards its construction, because the separation space and the gas removal space may be placed side by side and separated from each other by a preferably vertical wall in which the gas removal apertures have been formed. The annular overflow which is part of the mentioned apparatus of prior art implies rather more complicated wall structures. By the shape of the gas removal apertures the further effect is achieved that the access of fibres into the gas removal space is inhibited. In practice, liquid is removed from the separation space in that the liquid level settles at the height of the lower margins of the gas removal apertures, and any control of the vacuum system in view of directing the liquid flow is therefore altogether unnecessary.

It is most appropriate to design the means of the invention so that the gas removal space encircles annularly the separation space, which has a substantially cylindrical shape in its upper part at least. The gas removal apertures are then arranged to constitute a band running around the wall confining the separation space and the gas removal space. In the annular gas removal space the gas can be conducted in its natural direction of travel, that is upward, by connecting the vacuum source to the top end of the gas removal space. The water vapour contained in the upwardly rising gas may then be condensed by placing in the upper part of the gas removal space a spray water duct, from which water may be sprayed against the gas flow.

The invention is described in the following in detail with the aid of an example, with reference to the attached drawing, wherein:

DETAILED DESCRIPTION OF THE INVENTION

Figure 1:
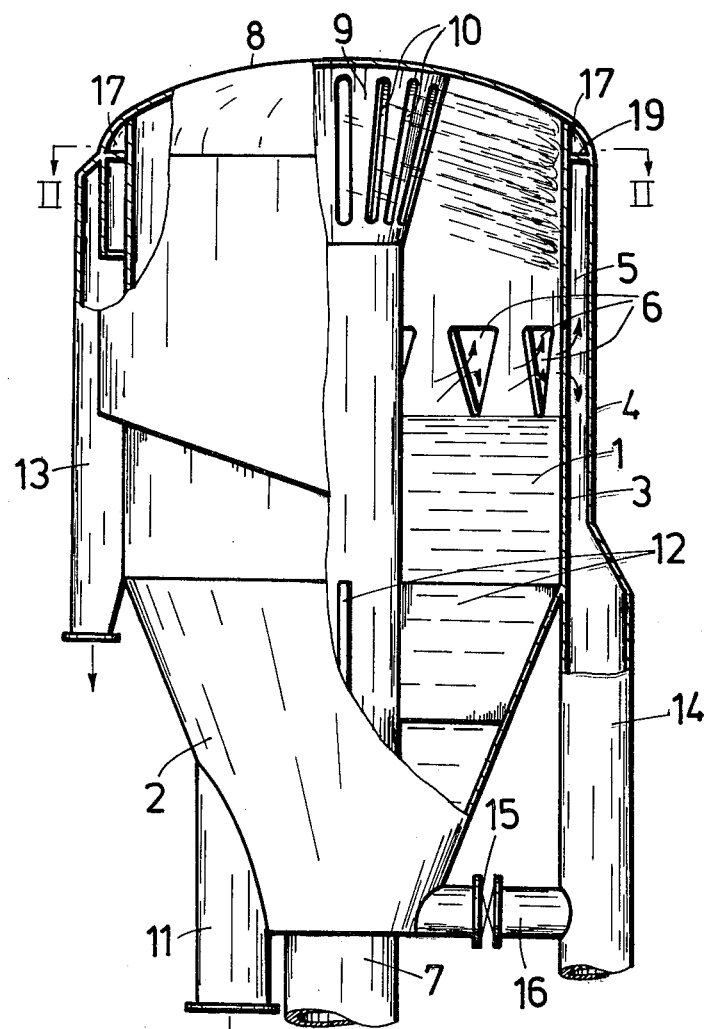
FIG. 1 presents a means according to the invention in elevational view and partly sectioned.
Figure 2:
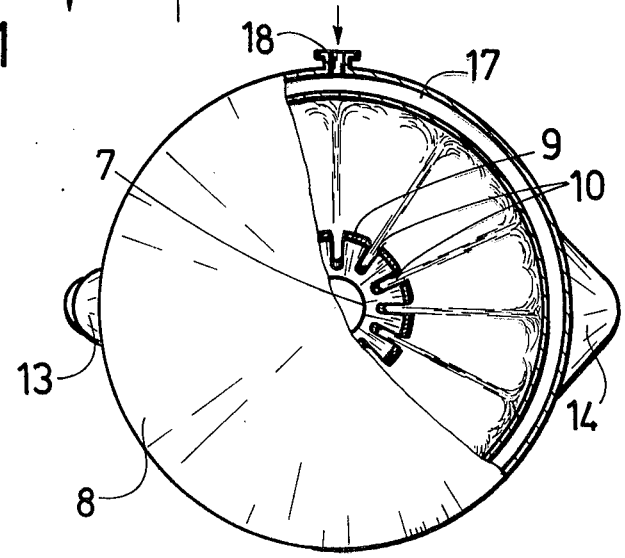
FIG. 2 shows the means of FIG. 1 seen from above and partly sectioned along the line II—II.

The drawing depicts a means for use in connection with paper machines and which removes the air from the fibre suspension that is being conducted onto the wire. The separation of air takes place in a wide separation space 1, which is encircled by a jacket composed of a bottom part 2 shaped like a truncated cone and of a cylindrical upper part 3. This cylindrical upper part 3 is encircled by another cylindrical jacket 4 so that there remains between the said components a gas removal space 5, which annularly encircles the upper part of the separation space 1. The separation space 1 and gas removal space 5 communicate with each other through gas removal apertures 6 having the shape of triangles standing on their apex. These apertures have been provided with uniform spacing to form a band running around the cylindrical jacket 3 in one plane.

To the purpose of conducting into the separation space 1 the fibre suspension which one desires to treat, a vertical tube 7 has been centrally disposed in the means, and this tube terminates in a dispersion nozzle 9 affixed to the roof 8 of the separation space. The dispersing nozzle 9 has on its surface, at uniform intervals, elongated slits 10. On the bottom of the separation space 1 there begins a vertical draining tube 11, through which the suspension accumulating in the lower part of the separation space may be withdrawn. The conical lower part of the separation space has furthermore been provided with vertical plates 12, which serve as flow guiding members. For removal of the air separated from the suspension, the gas removal space 5 has been connected at its top end, by the tube 13, to a vacuum pump not shown in the figures. At the lower end of the gas removal space, again, a vertical tube 14 provided for the removal of condensed water vapour has its start. The tube 14 and the bottom of the separation space 1 have been connected together by a vertical side conduit 16 incorporating a valve 15.

For the condensing of water vapour, there has been provided, above the gas removal space 5, an annular duct 17 and which has been connected to the water mains by the connector 18. The bottom 19 of the duct 17 has a perforation such that water from the mains can be sprayed into the gas removal space 5.

The means presented in the figures is employed in that the fibre suspension containing air is conducted by the tube 7 into the dispersion nozzle 9 and through the nozzle's slits 10 into the upper part of the separation space 1. The flow is atomized into droplets in the slits 10 and it is jetted against the inner surface of the cylindrical jacket 3 of the separation space. The separation space 1 communicates through the gas removal apertures 6 with the vacuum prevailing in the gas removal space 5, so that air that has been entrained in the fibre suspension in previous process steps will be released and escapes through the gas removal space 5 and the vacuum pump to the outside of the means. The fibre suspension droplets relieved of air run into the conical lower part of the separation space 1, and the suspension is withdrawn from the separation space through the draining tube 11. The outflow is usually controlled so that the liquid level of the suspension accumulating in the separation space and which has been freed of gas assumes a height on a level which the apices of the triangular gas removal apertures 6, whereby the whole area of said apertures is open. If now the running conditions change so as to cause a rising tendency of the liquid level, the apertures 6 begin to operate as overflow weirs and the liquid running into the gas removal space 5 ends up in the tube 14, whence it may be transferred to other process steps. However, part of this flow is conducted by the side tube 16 back to the separation space 1, because in view of the dead corners in the conical lower part of the separation space the drain flow through tube 11 has to be equalized. Further means inhibiting circulation of the outflow are the plates or baffles 12 mounted between the conical surface 2 and the tube 7.

The air separated from the fibre suspension usually contains water vapour, which is removed in the gas removal space 5 before the air enters the vacuum pump. In view hereof, spraying water is introduced through pipe connectors 18 into the annular duct 17 and this water is jetted through holes in the bottom 19 of the duct against the ascending air flow. In addition to condensing the water vapour, this spray water cools the air, an action which is favourable with regard to the operation of the vacuum pump. The spray water also carries along with it the null fibre fluff which may or may not separate from the fibre suspension under effect of vacuum and which will then escape together with the spray water into the tube 14 and further out from the apparatus. The spray water quantity is minimal enough to have no influence on the flow conditions in the conical lower part of the separation space 1.

It is obvious to one skilled in the art that the invention is not exclusively confined to the embodiment presented here and that it may vary within the scope of the claims. For instance, one may use for the forming of liquid droplets, instead of elongated slits, holes which are uniformly distributed over the surface of the distributing nozzle 9. The shape of the gas removal apertures may also differ from that which has been shown in the figures. It is moreover possible to dispose in the separation space, above the gas removal apertures, various liquid droplet guiding members, which reduce the drop size and increase their delay time in the sphere of action of the vacuum. These guiding members may be, for instance, horizontal ring plates affixed to the inside of the cylindrical jacket 3, or radial bars or pipes mounted between the jacket 3 and the tube 7.

I claim:

1. Improvement in a means for separating gas from a liquid suspension, in particular from a fibre suspension being conducted to a machine for manufacturing paper, said means comprising a vertically extending tube, first wall laterally enclosing and spaced radially outwardly from said tube defining a vertically extending separating space therebetween, a dispersion nozzle located at the upper end of said tube for atomizing a suspension flowing upwardly in said tube and through said nozzle into said separating space, a drain conduit spaced vertically below said dispersion nozzle and connected to said separating space for removing the suspension relieved of gas, a gas removal space in communication with said separating space, a vacuum source connected to said gas removal space so that gas can be freed with the aid of subatmospheric pressure from the suspension in the separating space and drawn therefrom into said gas removal space, wherein the improvement comprises that second walls laterally enclose at least a vertically extending part of said first walls and define therebetween an annular said gas removal space, a plurality of upwardly widening triangularly shaped gas removal apertures located in said first wall in an annular band around said separating space and opening therefrom into said gas removal space, the apex of each of said triangularly shaped apertures directed downwardly, and the annular band of said apertures spaced vertically downwardly from said dispersion nozzle and vertically upwardly from said drain conduit.

2. Means according to claim 1, wherein said vacuum source is connected to said annular gas removal space at a position spaced vertically upwardly from said apertures so that the gas flow passing through said apertures can be deflected in an upward direction.

3. Means according to claim 2, including a spray water duct located at the top of said gas removal space spaced vertically upwardly from the upper ends of said gas apertures, and said spray water duct having openings therein for directing a spray of water downwardly into the ascending gas flow whereby the water vapor present in the gas can be condensed.

* * * * *